United States Patent [19]

Alster et al.

[11] Patent Number: 4,650,334
[45] Date of Patent: Mar. 17, 1987

[54] OPTICAL STRAIGHTNESS GAUGE AND METHOD

[75] Inventors: Louis G. Alster, Morton; Chester S. Gardner, Champaign, both of Ill.

[73] Assignee: Caterpillar Inc., Peoria, Ill.

[21] Appl. No.: 789,264

[22] Filed: Oct. 18, 1985

[51] Int. Cl.⁴ ............................................. G01B 11/24
[52] U.S. Cl. .................... 356/376; 356/237; 356/394
[58] Field of Search ................ 356/376, 391–394, 356/426–428, 237

[56] References Cited

U.S. PATENT DOCUMENTS

| | | | |
|---|---|---|---|
| 3,470,384 | 9/1969 | Bodnar et al. | 250/224 |
| 3,604,940 | 9/1971 | Matthews | 356/426 |
| 3,737,856 | 6/1973 | Lehrer et al. | 356/393 |
| 3,874,799 | 4/1975 | Isaacs et al. | 356/405 |
| 3,907,438 | 9/1975 | Holeman | 356/376 |
| 3,922,094 | 11/1975 | Colding et al. | 356/237 |
| 3,966,332 | 6/1976 | Knapp et al. | 356/427 |
| 4,149,187 | 4/1979 | Palmer et al. | 358/106 |

FOREIGN PATENT DOCUMENTS

| | | | |
|---|---|---|---|
| 3334976 | 4/1985 | Fed. Rep. of Germany | 356/426 |
| 7811112 | 5/1980 | Netherlands . | |
| 2030286 | 4/1980 | United Kingdom . | |
| 2058344 | 4/1981 | United Kingdom . | |

OTHER PUBLICATIONS

Acudata Electronic Crankshaft Journal Profile Gauge Data Sheet, copyrighted 1979 by Lion Precision Corporation.
Excerpt from Guideline for Reusable Parts, copyrighted by CTCo, in 1980.

Primary Examiner—F. L. Evans
Attorney, Agent, or Firm—Stephen L. Noe

[57] ABSTRACT

An apparatus and method for measuring the profile of a curvilinear surface is provided. The apparatus includes a light source for substantially uniformly delivering radiant energy along an illumination plane substantially tangent to the curvilinear surface. The delivered radiant energy is optically imaged at a first image plane. A first portion of the delivered radiant energy is blocked by an optical field stop having an accurately straight reference profile edge portion, and a second portion of the imaged radiant energy is focused on a transducer located at a second image plane. The transducer produces a coded data signal in response to the focused radiant energy. A microprocessor receives the coded data signal, determines the deviation of the profile of the curvilinear surface from the reference profile edge portion, and produces a straightness signal in response to the determined deviation. Nonuniformities of the apparatus are automatically compensated for. The apparatus is simple to operate and facilitates 100% inspection in a production environment.

18 Claims, 7 Drawing Figures

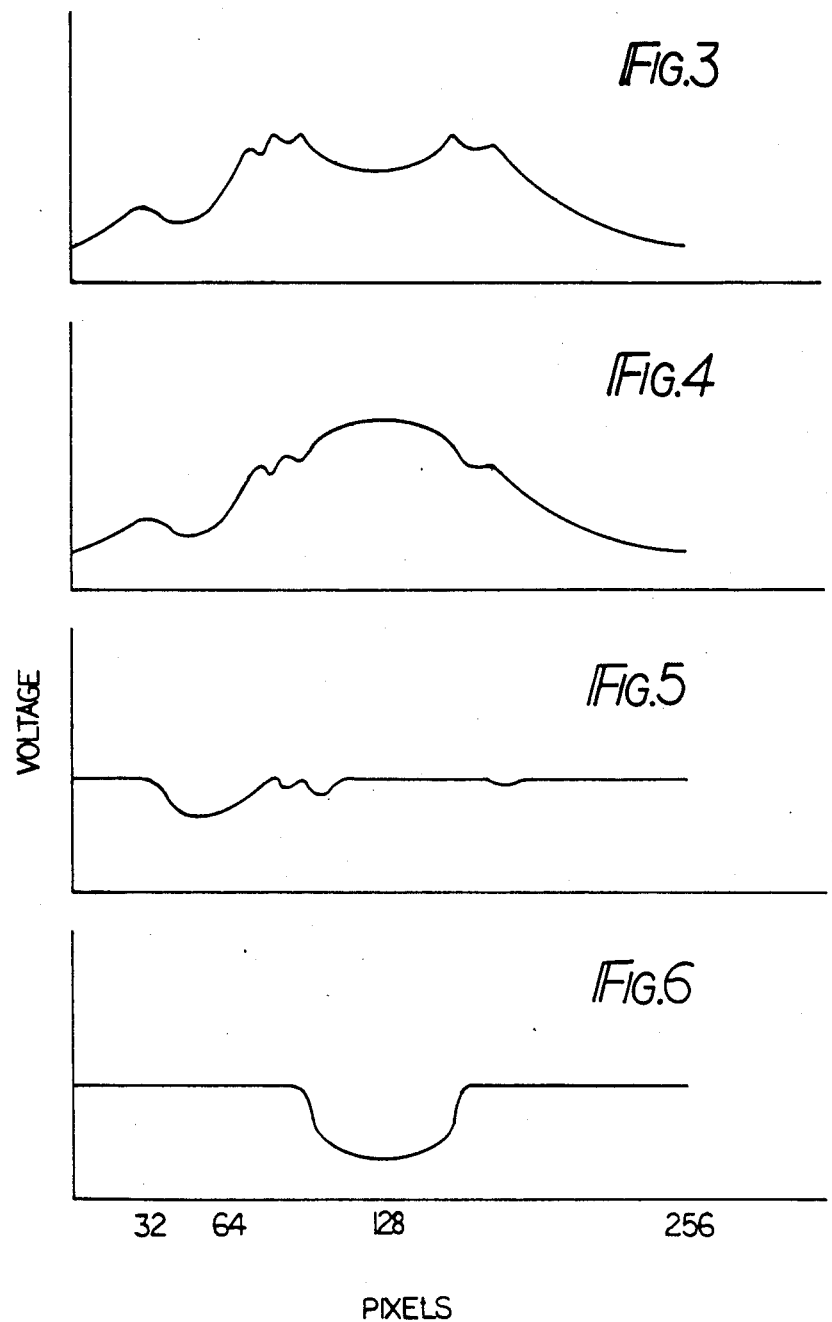

OPTICAL STRAIGHTNESS GAUGE AND METHOD

TECHNICAL FIELD

This invention relates generally to an apparatus and method for measuring the straightness of an object and, more particularly, to an apparatus and method for optically measuring the straightness of a tangential portion of a cylindrical curvilinear surface.

BACKGROUND ART

Manufacturing processes often require that the straightness of the profile of an object be accurately determined. For example, bearing surfaces such as crankshaft journals are required to be straight within a given tolerance. Failure to conform to the specified tolerance requires that a particular crankshaft be rejected or reworked, owing to the fact that the out-of-straight condition is likely to result in premature bearing failure.

Various devices and methods for measuring straightness have been proposed and used in the past. The simplest of these involves the use of a dial indicator in conjunction with a straightedge and fixturing device. The practice of this method is subject to errors and inaccuracies based primarily on the skill of the operator involved. The set up and test procedure must be carefully controlled or the results from the test are substantially without meaning.

More sophisticated straightness tests can be performed with precision electronic equipment, for example, laser interferometers or noncontacting capacitive probes. Owing to the high cost of such equipment, the tests are best performed in an inspection laboratory, and are not practical for production floor use. In addition, highly skilled technicians must be utilized to operate such sophisticated inspection devices.

For the reasons set forth above, none of the devices currently available for measuring the straightness of crankshaft journals and other cylindrical surfaces requiring accurate straightness are suited for a production environment. Therefore, 100% production testing is impractical, and only spot inspection techniques are readily applied. It is desirable to provide a measuring apparatus that can be utilized on the production floor to do 100% straightness checking. Such apparatus must necessarily be of rugged design, low in cost, and simple to operate. No complex set up or fixturing should be required to utilize the measuring device, and no extensive operator training should be necessary.

The present invention is directed to overcoming one or more of the problems as set forth above.

DISCLOSURE OF THE INVENTION

In one aspect of the present invention, an apparatus for measuring the profile of a tangential portion of a curvilinear surface is provided. The apparatus includes an illumination device for delivering radiant energy across the curvilinear surface. A portion of the delivered radiant energy is collected by a first optical system, and is imaged at a first image plane. An optical reference located at the first image plane masks a first portion of the imaged radiant energy and passes a second portion. The passed radiant energy is collected by a second optical system and focused at a second image plane. A transducer located at the second image plane receives the focused radiant energy and responsively produces a coded data signal.

In a second aspect of the present invention, a method for measuring the profile of a tangential portion of a curvilinear surface is provided. The method includes the steps of delivering radiant energy across the curvilinear surface, collecting a portion of the delivered radiant energy and imaging the collected energy at a first image plane. A first portion of the radiant energy is masked and a second portion is collected and focused at a second image plane. A coded data signal is produced in response to the focused radiant energy.

The present invention provides a straightness measuring apparatus and method that is suitable for performing 100% inspection in a production environment. The apparatus is rugged and relatively low in cost, and is simple to operate without necessitating elaborate fixturing or extensive set up time.

BRIEF DESCRIPTION OF THE DRAWINGS

For a better understanding of the present invention, reference may be made to the accompanying drawings, in which:

FIG. 3 is a theoretical graphical representation of an uncompensated coded data signal produced by measuring the straightness of an unknown surface;

FIG. 4 is a theoretical graphical representation of an uncompensated coded data signal produced by measuring the straightness of a master calibration surface of known accurate straightness;

FIG. 5 is a theoretical graphical representation of an uncompensated "DARK BIAS" coded data signal produced by an embodiment of the present invention;

FIG. 6 is a theoretical graphical representation of the coded data signal of FIG. 3, following compensation for the effects of FIGS. 4 and 5.

BEST MODE FOR CARRYING OUT THE INVENTION

Figure 1:
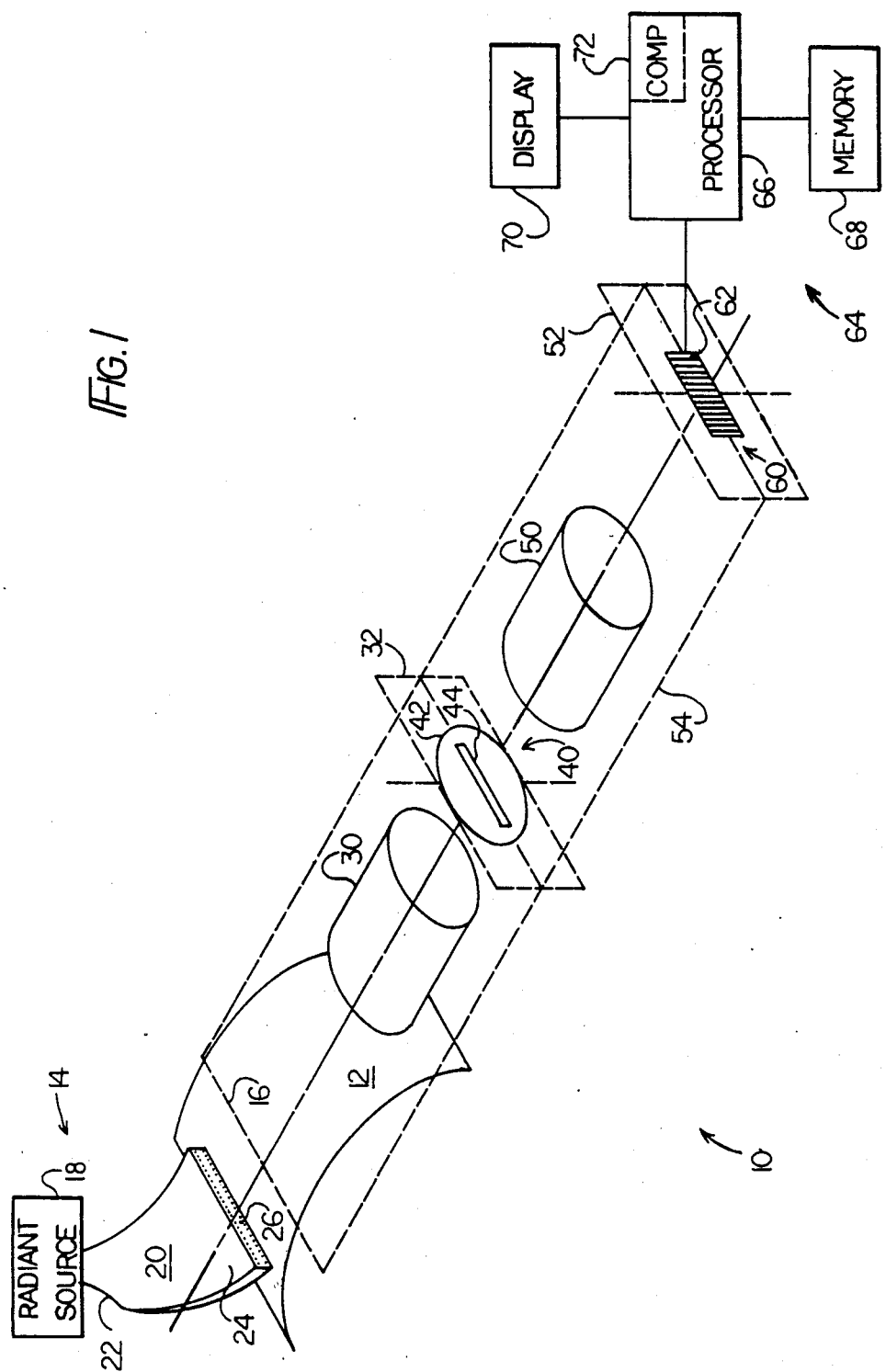
FIG. 1 is a schematic diagram showing the major components utilized in one embodiment of the present invention.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

In FIG. 1, the apparatus 10 is shown in conjunction with a curvilinear surface 12. The curvilinear surface 12 is, for example, the bearing surface of a crankshaft journal. It will be recognized that the apparatus 10 can be applied effectively to measure the straightness of curvilinear surfaces other than the bearing surfaces of crankshafts. An illumination means 14 is positioned to deliver radiant energy across a tangential portion 16 of the curvilinear surface 12. The illumination means 14 preferably includes a light source 18 and a fiber optic cable array 20. The fiber optic cable array 20 has a first end portion 22 connected to the light source 18, and a second end portion 24 disposed along a path substantially parallel to the tangential portion 16 of the curvilinear surface 12. The cable array 20 is composed of a predetermined plurality of discrete energy transmissive fiber elements 26, as is well-known in the field of fiber optics. The plurality of fiber elements 26 is substantially uniformly disposed along the path parallel to the curvilinear surface 12. In the preferred embodiment, the light source 18 is adapted to produce substantially monochromatic light.

A first optical means 30 is positioned to collect a portion of the radiant energy delivered across the curvilinear surface 12, and images the collected radiant energy at a first image plane 32. The first optical means 30 can be any arrangement of lenses, prisms, and other optical devices suitable to image the radiant energy collected from the line of intersection of the radiant energy with the curvilinear surface 12.

A reference means 40 is positioned at the first image plane 32. The reference means 40 includes an optical field stop 42 adapted to produce a reference profile edge portion 44. Optical field stops are known in the art to include an optically opaque mask portion and an optically transparent window portion. The reference profile edge portion 44 is an accurately straight edge of the mask portion of the optical field stop 42. Since the reference profile edge portion 44 serves as the straightness reference device for the apparatus 10, it must be accurately straight to a precision at least as great as the precision desired for the measurements to be made by the apparatus 10, or must be suitably compensated for in a manner described below. The reference profile edge portion 44 is disposed substantially parallel to the tangential portion 16 of the curvilinear surface 12. As positioned, the reference means 40 masks a first portion of the radiant energy imaged at the first image plane 32, and passes a second portion of the imaged radiant energy.

A second optical means 50 is positioned to collect the portion of the imaged radiant energy passed by the reference means 40, and focuses the collected radiant energy at a second image plane 52. Like the first optical means 30, the second optical means 50 can be composed of any suitable arrangement of optical elements.

An optical plane 54 passes through the optical center of each of the first and second optical means 30,50 and is parallel to the tangential portion 16 of the curvilinear surface 12. The straightedge of the mask that forms the reference profile edge portion 44 of the optical field stop 42 is spaced apart a predetermined small distance from the optical plane 54, for example 0.002 to 0.02 inches. Therefore, the reference profile edge portion 44 is positioned parallel to and slightly spaced apart from the optical plane 54.

A transducer means 60 is positioned at the intersection of the optical plane 54 and the second image plane 52. The transducer means 60 is preferably an array of radiant energy receptive devices 62. The energy receptive devices 62 are substantially uniformly disposed along the path formed by the intersection of the optical plane 54 and the second image plane 52. Each of the energy receptive devices 62 is adapted to produce a discrete electrical voltage signal in response to the magnitude of radiant energy received by the respective device 62. The combined plurality of discrete electrical voltage signals produced by the energy receptive devices 62 constitutes a coded data signal. Therefore, the transducer means 60 receives the focused radiant energy from the second optical means 50 and responsively produces a coded data signal.

An analytic means 64 is electrically connected to the transducer means 60 and receives the produced coded data signal. The analytic means 64 is preferably a programmed microprocessor 66 associated with a memory device 68. The analytic means 64 decodes the received coded data signal, determines the deviation of the profile of the tangential portion 16 of the curvilinear surface 12 from the reference profile edge portion 44, and produces a "straightness" signal in response to the determined deviation. The produced "straightness" signal is preferably displayed on a display device 70 associated with the microprocessor 66.

The analytic means 64 includes compensation means 72 for detecting predetermined nonuniform optical characteristics of the apparatus 10, storing data responsive to the detected characteristics, and modifying the produced coded data signal in response to the stored data. The compensation means 72 also utilizes the properly programmed microprocessor 66, and the data corresponding to the detected nonuniform optical characteristics is stored in the memory device 68.

Figure 2:
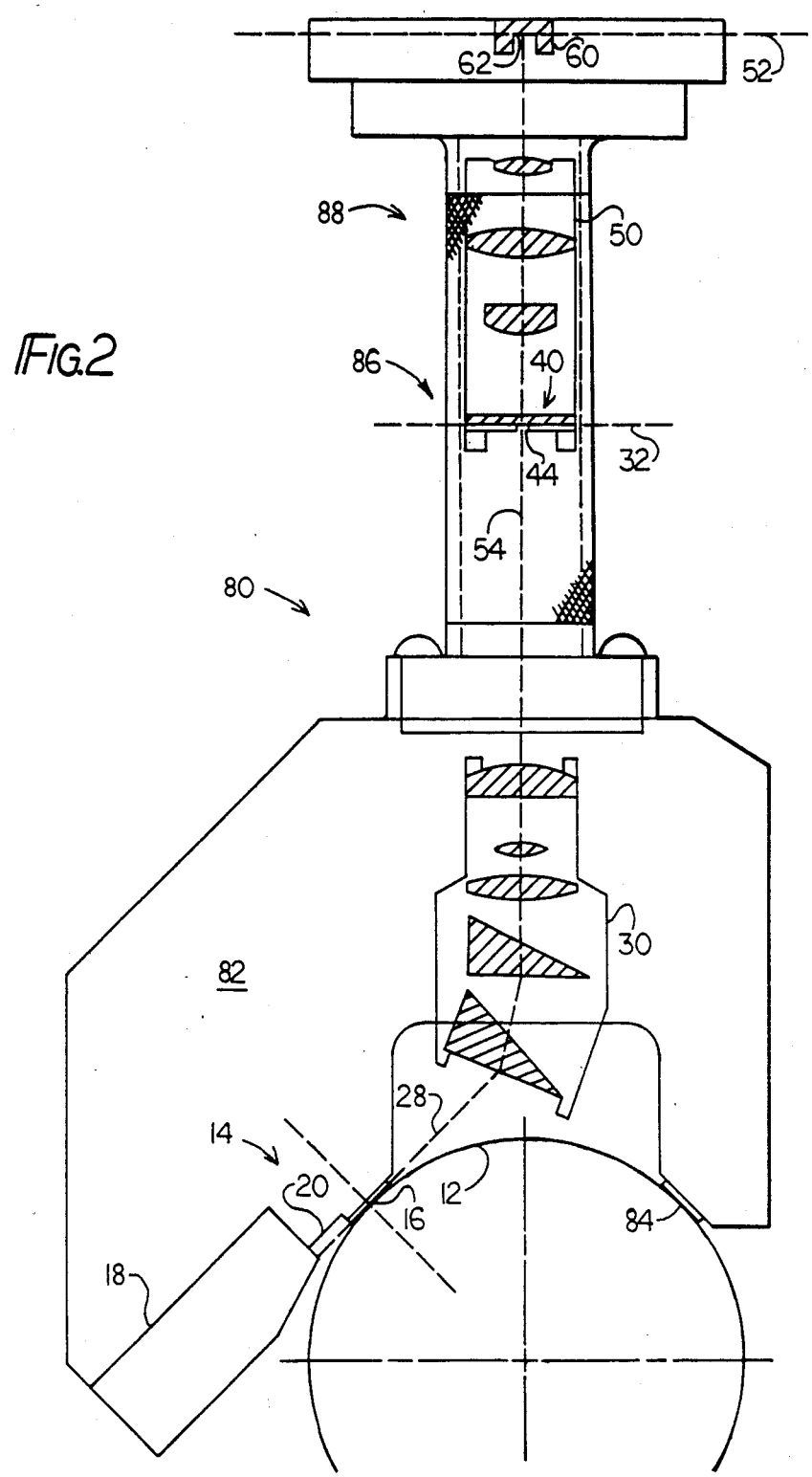
FIG. 2 is a partially sectioned plan view of an embodiment of the present invention.

Many of the elements schematically illustrated in FIG. 1 can be seen in a preferred relationship to one another in FIG. 2. A substantial portion of the apparatus 10 is advantageously contained in a hand held probe 80. The probe 80 includes a first U-shaped end portion 82. The U-shaped end portion 82 includes a surface contact means 84 for automatically referencing the optical plane 54 to the tangential portion 16 of the curvilinear surface 12. The surface contact means 84 is preferably a plurality of small contact pads connected to the U-shaped end portion 82, and adapted to engage the curvilinear surface 12.

The illumination means 14 is connected to one leg of the U-shaped end portion 82, and is positioned to deliver radiant energy from the light source 18, through the fiber optic cable array 20, and along an illumination plane 28 parallel to the optical plane 54.

The first optical means 30 is also positioned within the U-shaped end portion 82, and is adapted to image radiant energy collected as it passes along the illumination plane 28 across the tangential portion 16 of the curvilinear surface 12, at the first image plane 32. The first image plane 32 is located along an intermediate portion 86 of the probe 80. The outer surface of the intermediate portion 86 is preferably a gripable, substantially tubular surface, and is used to hand hold the probe 80. The reference means 40 is positioned along the first image plane 32 within the intermediate portion 86, and the reference profile edge portion 44 is positioned substantially parallel to and slightly spaced apart from the optical plane 54.

The second optical means 50 is located in a second end portion 88 of the probe 80. The second optical means 50 collects radiant energy that is not blocked by the reference means 40, and focuses the collected radiant energy at the second image plane 52. The transducer means 60 is likewise located in the second end portion 88 of the probe 80, with the plurality of radiant energy receptive devices 62 being disposed along the path formed by the intersection of the optical plane 54 and the second image plane 52.

Positioning the reference profile edge portion 44 between the first and second optical means 30,50 advantageously reduces problems caused by light diffraction and often associated with optical systems. For example, placing the reference profile edge portion 44 at or near the curvilinear surface 12 would result in the occurrence of substantial diffraction effects, tending to spread the radiant energy away from the optical plane 54. The degree to which the radiant energy would be diffracted would vary in relation to the amount the curvilinear surface 12 is out of straight. In a severe case, the first optical means 30 would be unable to fully image the profile of the curvilinear surface 12 at the first image plane 32, and the apparatus 10 would not function accurately. The remote location of the reference profile edge portion 44 effectively counters such diffraction problems.

Recognizing that various static nonuniformities are likely to exist in the combination of elements utilized in the apparatus 10, the compensation means 72 is included. Such inaccuracies can result from uneven distribution of the radiant energy delivered from the fiber optic cable array 20, nonuniformities in the optical systems utilized, deviations in responsiveness of the plurality of radiant energy receptive devices 62 utilized in the transducer means 60, and from various other component and manufacturing tolerances. Such nonuniformities, if not accounted for, can result in erroneous indications regarding the straightness of the curvilinear surface 12 being measured. By calibrating the apparatus 10 utilizing a curvilinear surface 12 having a known accurate straightness, such nonuniformities can be substantially obviated.

Calibration is performed by measuring the master or calibration surface, and storing data responsive to the detected characteristics of the calibration surface in the memory device 68. Calibration data responsive to the coded data signal produced when no radiant energy is delivered to the transducer means 60 is also stored in the memory device 68. During subsequent use of the apparatus 10 for measuring straightness of unknown surfaces, the stored data is utilized to modify the coded data signal.

In the preferred embodiment, the analytic means 64 determines the straightness of the profile being checked, by solving the following mathematical algorithm:

TRUE PROFILE=(MEASURED PROFILE−DARK BIAS)/(FLAT PROFILE * OPTICAL NONUNIFORMITIES−DARK BIAS).

In this formula, "MEASURED PROFILE" is the actual coded data signal received by the analytic means 64 from the transducer means 60 while measuring the curvilinear surface 12 under test. A typical "MEASURED PROFILE" is shown in FIG. 3. "FLAT PROFILE * OPTICAL NONUNIFORMITIES" is the coded data signal received by the analytic means 64 from the transducer means 60 while measuring the accurately straight master or calibration surface, and is depicted in FIG. 4. The plots in both of FIGS. 3 and 4 include the cumulative effects of all system nonuniformities, as discussed above. For this reason, the master calibration surface does not appear as a straight line in FIG. 4. "DARK BIAS" is the coded data signal received by the analytic means 64 when no light is presented to the transducer means 60, and is shown in FIG. 5. Any deviation from a straight line represents nonuniform electrical characteristics of the apparatus 10, because the optical systems are not involved in the "DARK BIAS" test.

Finally, in FIG. 6, "TRUE PROFILE" is the calculated and compensated data signal that most accurately describes the profile of the curvilinear surface 12 under test. "TRUE PROFILE" is the mathematical result of combining the stored compensation data according to the above formula. From this "TRUE PROFILE" signal is derived the "go no/go" or "straightness" signal, which is simply a number representing the maximum peak-to-valley deviation found by performing a best line fit through the "TRUE PROFILE" data. FIG. 6 clearly illustrates the advantage in measuring accuracy obtained through use of the compensation algorithm. It should be noted that the graphical representations of FIGS. 3–6 are for illustrative purposes only, and as such are exaggerated to provide ready comprehension of the concepts involved.

Figure 7:
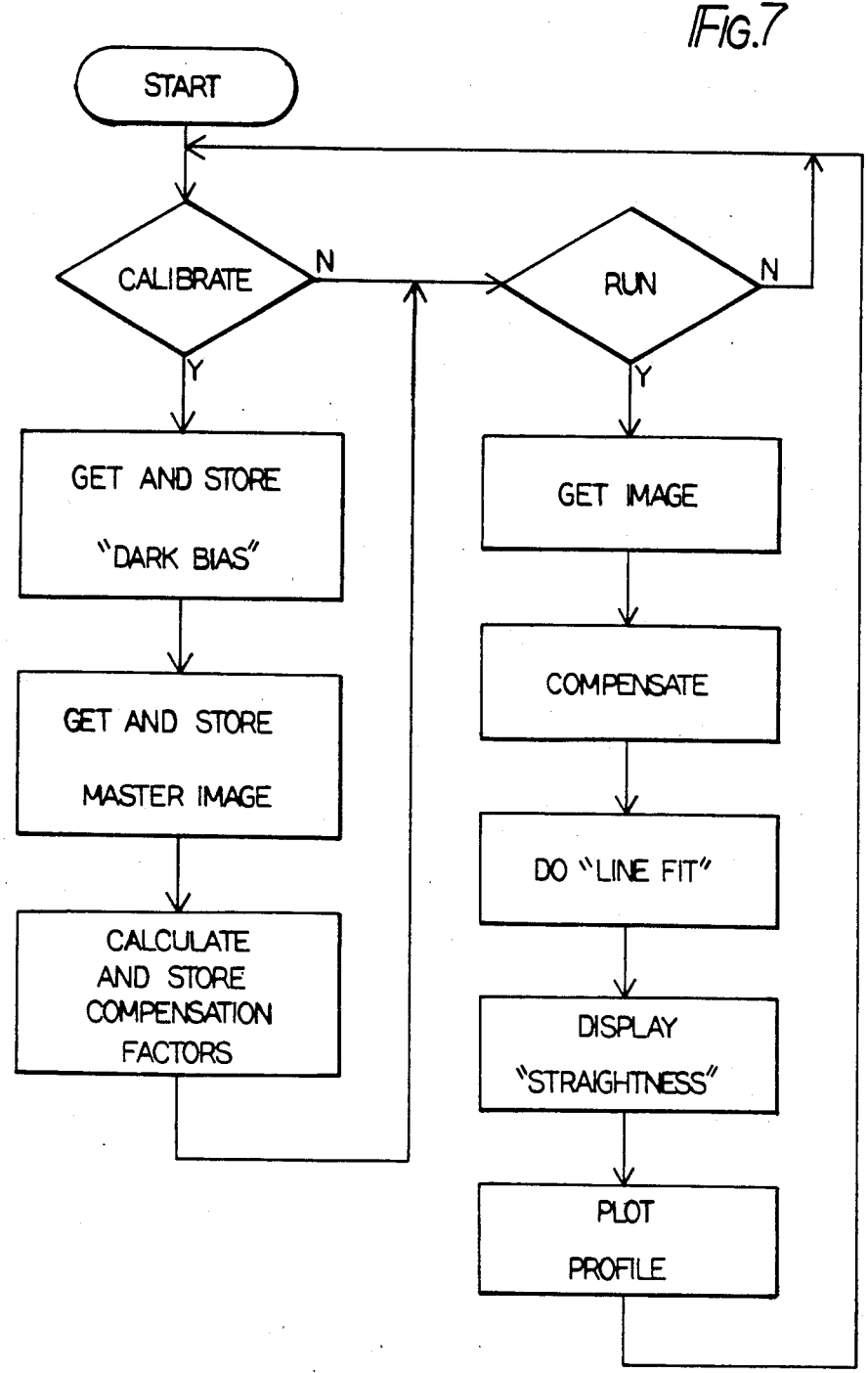
FIG. 7 is a functional flow diagram of a computer program used with one embodiment of the present invention.

FIG. 7 is a functional flow diagram of software sufficient to perform the analytic functions of the present invention. From this flowchart, a programmer of ordinary skill can develop a specific set of program instructions necessary to implement the instant invention. While the best mode of the invention is considered to include a properly programmed microprocessor 66, the result of which is the creation of novel hardware associations within the microprocessor 66 and its associated devices, it is possible to implement the instant invention utilizing traditional hard wired circuitry.

Beginning at the block labeled "START" in FIG. 7, the apparatus 10 enters either the "CALIBRATE" mode or the "RUN" mode. The selection of operating modes can be made in a variety of ways, for example, by using switches mounted on the probe 80, by selection from a computer keyboard, or by automatic defaults programmed into the software. The actual selection process is unimportant to the invention. Normally, "CALIBRATE" is selected at the beginning of a test sequence, and the program proceeds down the left side of the flowchart in FIG. 7.

The coded data signal representing a "DARK BIAS" reading is next established, and stored in the memory device 68. The operator then obtains a measurement of the master or calibration surface, with the resulting data again being stored in the memory device 68. Utilizing the stored compensation data, compensation factors are next calculated and stored in the memory device 68. These compensation factors are such that, when combined with actual straightness measurements taken with the apparatus 10, the resulting coded data signal is substantially free from the effects of system nonuniformities.

Following calibration, program control proceeds to the "RUN" mode, in which an actual image of a curvilinear surface 12 to be tested is obtained. This image, actually a coded data signal delivered from the transducer means 60, is then compensated for according to the stored compensation factors, resulting in the "TRUE PROFILE", as exemplified by FIG. 6. In many cases, it is desirable to also compensate for evident aberrations in the "TRUE PROFILE" data, for example, by ignoring isolated high or low signal values or by utilizing more complex data smoothing techniques, as is known in the data collection art. The need for such additional compensation can be determined for each particular application.

A "best fit" line is next applied to the "TRUE PROFILE" data, and the maximum peak-to-valley deviation of the compensated data is determined. This deviation is an indication of the "straightness" of the curvilinear surface being measured, and can be expressed as an absolute number or as a "go no/go" signal. In whatever manner is chosen, the "straightness" is displayed for the operator's information. If desired, the actual profile of the tested surface is next plotted, either on an oscilloscope or on an X-Y plotter. At this point the measurement is complete and program control returns to the "START" block.

Although the embodiment of the invention described envisions manual use by an operator or inspector in a production facility, the basic system lends itself well to use in a fully automated environment. For example, the probe 80 can be implemented as an integral part of a robot "arm", and the "go no/go" signal can readily direct a tested workpiece to proceed as an acceptable part, or to be rejected and marked for rework or scrap. Other variations of the invention described herein will be apparent to those skilled in the art.

INDUSTRIAL APPLICABILITY

Operation of the apparatus 10 is best described in relation to its use in checking the straightness of a curvilinear surface portion of a cylindrical object, for example, the bearing surface of a crankshaft journal. The application of the apparatus 10 to a crankshaft journal is described for exemplary purposes only, and it is emphasized that the apparatus 10 is useful to measure the straightness of other curvilinear surfaces.

Following calibration, the probe 80 is gripped at the intermediate portion 86, and the surface contact means 84 of the U-shaped end portion 82 is placed in contact with the curvilinear surface 12. In response to the surface contact means 84 engaging the curvilinear surface 12, the probe 80 is automatically properly positioned for measuring the straightness of a tangential portion 16 of the curvilinear surface 12. Light delivered from the illumination means 14 is directed along the illumination plane 28 across the curvilinear surface 12. The illumination plane 28 meets the curvilinear surface 12 along a line of tangency, therefore, a profile of the curvilinear surface 12 at the line of tangency is received by the first optic means 30 and is imaged at the first image plane 32.

A portion of the radiant energy delivered at the first image plane 32 is blocked by the mask portion of the optical field stop 42. The remaining portion of the imaged radiant energy passes through the optical field stop 42 and is collected by the second optical means 50. Owing to the fact that the optical field stop 42 includes the accurately straight reference profile edge portion 44, the portion of the radiant energy passed by the optical field stop 42 includes information directly responsive to the straightness of the profile of the curvilinear surface 12 at the line of tangency with the illumination plane 28. The profile information is focused by the second optical means 50 at the second image plane 52.

The transducer means 60 receives the focused radiant energy profile information and responsively produces the coded data signal. Assuming that the transducer means 60 is composed of a linear array of, for example, 256 discreet radiant energy receptive devices 62, referred to in the art as pixels, the coded data signal is a digital electrical signal composed of 256 discreet voltage levels. The actual signal voltage level produced by each of the energy receptive devices 62 is responsive to the intensity of the radiant energy falling on the particular energy receptive device 62.

The coded data signal is received by the analytic means 64 and is decoded to determine the deviation of the detected profile of the tangential portion 16 of the curvilinear surface 12 from the reference profile edge portion 44. On the basis of this analysis, a "go no/go" indication is provided on the display device 70. The display device 70 can be a digital readout, audio device, or simple indicator light. Alternatively or in conjunction with such a "go no/go" indication, the actual profile of the tangential portion 16 represented by the coded data signal, can be graphically displayed, for example, on an oscilloscope or plotter. It may be useful for inspection purposes to provide such a graphic display. In any case, the operator is quickly and accurately provided with an indication of the straightness of the tangential portion 16 of the curvilinear surface 12 being measured. By merely rotating the probe 80 angularly about the curvilinear surface 12 and taking successive straightness measurements, the entire profile of the curvilinear surface 12 can be quickly and accurately scanned and analyzed.

It will be appreciated by those skilled in the art that the apparatus described schematically in FIG. 1 can be incorporated in probes differing in design and construction from that described in FIG. 2. Likewise, it is not necessary to implement any or all of the steps of FIG. 7 with a microprocessor. However, such implementation is deemed to be the best mode of practicing the invention. The embodiment of the invention described above is rugged and relatively low in cost. It is easy to use in a production environment and facilitates 100% inspection of cylindrical curvilinear surfaces that must meet critical straightness specifications.

Other aspects, objects, advantages, and uses of this invention can be obtained from a study of the drawings, the disclosure, and the appended claims.

We claim:

1. Apparatus for measuring the profile of a tangential portion of a curvilinear surface, comprising:
    illumination means for delivering radiant energy across said tangential portion of said curvilinear surface;
    first optical means for collecting a portion of said delivered radiant energy and imaging said collected radiant energy at a first image plane;
    reference means for masking a first portion of said imaged radiant energy and passing a second portion of said imaged radiant energy, said reference means having a reference profile edge portion and being located at said first image plane;
    second optical means for collecting said second portion of said imaged radiant energy and focusing said second portion of said imaged radiant energy at a second image plane; and
    transducer means for receiving said focused radiant energy and producing a coded data signal in response to said received focused radiant energy, said transducer means being located at said second image plane.

2. Apparatus, as set forth in claim 1, including analytic means for receiving said coded data signal, decoding said coded data signal, determining the deviation of said profile of said tangential portion of said curvilinear surface from said reference profile edge portion in response to said decoded data signal, and producing a straightness signal in response to said determined deviation.

3. Apparatus, as set forth in claim 2, wherein said analytic means includes compensation means for detecting predetermined nonuniform optical characteristics of said apparatus, storing data responsive to said detected characteristics, and modifying said produced coded data signal in response to said stored data.

4. Apparatus, as set forth in claim 1, wherein said illumination means includes a light source and a fiber optic cable array, said cable array having first and second end portions and a predetermined plurality of discrete energy transmissive fiber elements, one of said first and second end portions of said cable array being connected to said light source, and the other of said first and second end portions of said cable array having said transmissive fiber elements substantially uniformly disposed along a path substantially parallel to said tangential portion of said curvilinear surface.

5. Apparatus, as set forth in claim 4, wherein said light source produces substantially monochromatic light.

6. Apparatus, as set forth in claim 1, wherein said reference means includes an optical field stop adapted to produce said reference profile edge portion.

7. Apparatus, as set forth in claim 6, wherein said reference profile edge portion is disposed substantially parallel to said tangential portion of said curvilinear surface.

8. Apparatus, as set forth in claim 1, including an optical plane, said optical plane passing through the optical center of each of said first and second optical means and being parallel to said tangential portion of said curvilinear surface.

9. Apparatus, as set forth in claim 8, wherein said reference profile edge portion is spaced apart a predetermined distance from said optical plane.

10. Apparatus, as set forth in claim 9, wherein said predetermined distance is in a range of 0.002 to 0.020 inches.

11. Apparatus, as set forth in claim 8, wherein said transducer means includes a plurality of radiant energy receptive devices, said devices being substantially uniformly disposed along the intersection of said optical plane and said second image plane.

12. Apparatus, as set forth in claim 11, wherein each of said energy receptive devices is adapted to produce a discrete electrical signal in response to the magnitude of said focused radiant energy received by said respective device.

13. Apparatus, as set forth in claim 8, including surface contact means for automatically referencing said optical plane to said tangential portion of said curvilinear surface.

14. Apparatus for measuring the profile of a curvilinear surface, comprising:
   illumination means for substantially uniformly delivering radiant energy along an illumination plane substantially tangent to said curvilinear surface;
   first optical means for collecting a portion of said delivered radiant energy and imaging said collected radiant energy at a first image plane;
   an optical field stop having a substantially straight reference profile edge portion, said reference profile edge portion being positioned at said first image plane and disposed substantially parallel to said illumination plane, said optical field stop being adapted to block a first portion of said imaged radiant energy and pass a second portion of said imaged radiant energy;
   second optical means for collecting said second portion of said imaged radiant energy and focusing said second portion of said imaged radiant energy at a second image plane;
   transducer means for receiving said focused radiant energy and producing a variable coded data signal in response to said received focused radiant energy, said transducer means being positioned at said second image plane substantially parallel to said illumination plane; and
   analytic means for receiving said variable coded data signal, decoding said coded data signal, determining the deviation of said profile of said curvilinear surface from said reference profile edge portion in response to said decoded data signal, and producing a straightness signal in response to said determined deviation.

15. Apparatus, as set forth in claim 14, wherein said analytic means includes compensation means for detecting predetermined nonuniform optical characteristics of said apparatus, storing data responsive to said detected characteristics, and modifying said produced coded data signal in response to said stored data.

16. Apparatus, as set forth in claim 14, including an optical plane, said optical plane passing through the optical center of each of said first and second optical means and being parallel to said illumination plane, and wherein said reference profile edge portion is spaced apart a predetermined distance from said optical plane.

17. A method for measuring the profile of a tangential portion of a curvilinear surface, comprising:
   delivering radiant energy across said tangential portion of said curvilinear surface;
   collecting a portion of said delivered radiant energy and imaging said collected radiant energy at a first image plane;
   masking a first portion of said imaged radiant energy and passing a second portion of said imaged radiant energy;
   collecting said second portion of said imaged radiant energy and focusing said second portion of said imaged radiant energy at a second image plane;
   producing a coded data signal in response to said focused radiant energy; and
   producing a straightness signal in response to said coded data signal.

18. A method for measuring the profile of a tangential portion of a curvilinear surface, as set forth in claim 17, including the step of modifying said coded data signal to eliminate portions of said signal responsive to stimuli other than said second portion of said imaged radiant energy.

* * * * *